R. W. & L. H. BATEMAN.
WHEEL.
APPLICATION FILED SEPT. 8, 1908.
917,524.
Patented Apr. 6, 1909.
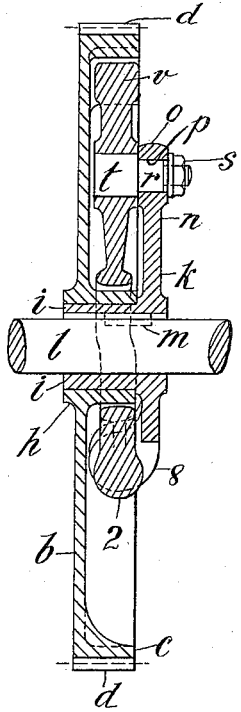
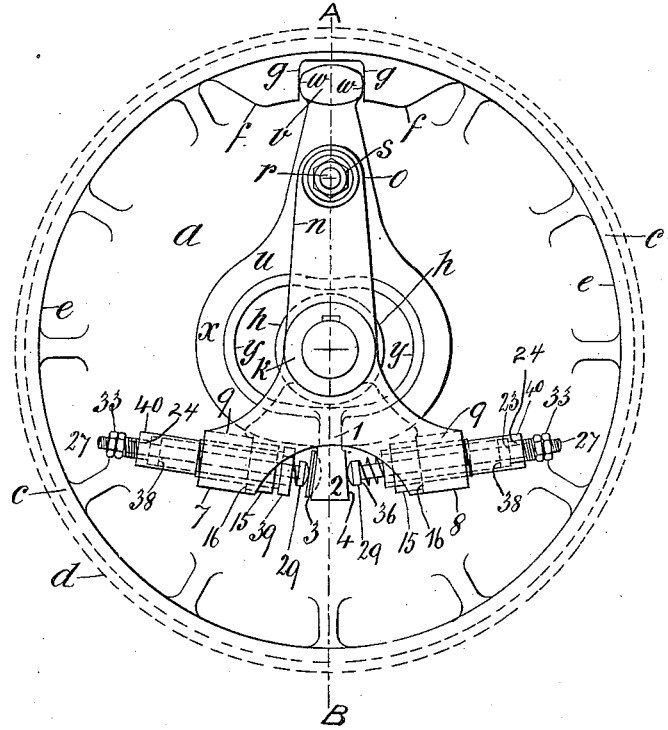
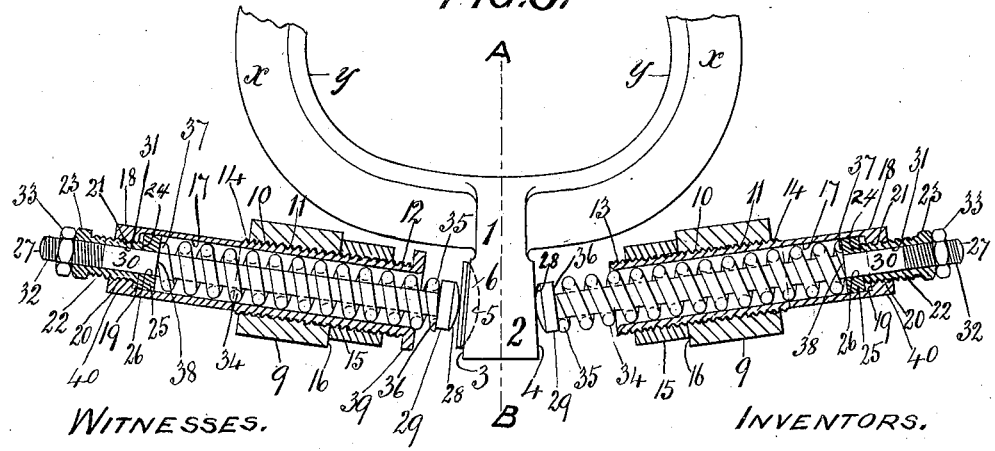
WITNESSES.
INVENTORS.

UNITED STATES PATENT OFFICE.

RICHARD WILKINSON BATEMAN AND LOFTUS HANSON BATEMAN, OF LEEDS, ENGLAND.

WHEEL.

No. 917,524.          Specification of Letters Patent.          Patented April 6, 1909.

Application filed September 8, 1908. Serial No. 452,143.

*To all whom it may concern:*

Be it known that we, RICHARD WILKINSON BATEMAN and LOFTUS HANSON BATEMAN, subjects of the King of Great Britain and Ireland, residing, respectively, at Potternewton, Leeds, and Hunslet, Leeds, both in the county of York, England, have invented Improvements in or Relating to Pulleys or Wheels, of which the following is a specification.

This invention relates to pulleys or wheels, hereinafter called wheels, and has for object an improved arrangement of springs and devices for absorbing the mechanical shocks and vibrations to which such wheels are subjected, particularly reversing driving wheels and driving pulleys, suitable for shafting, machinery and motors and which revolve at a high speed. In wheels embodying this invention the construction of such devices is simpler than the devices for like purposes heretofore proposed and the cushioning can be suitably adjusted with ease and facility to produce the best results. For this purpose according to this invention the wheels are constructed as we will now proceed to describe with reference to the accompanying illustrative drawings.

Figure 1 of such drawings is a central vertical section corresponding to the line A, B of Fig. 2, and Fig. 2 is a face view, of a driving gear wheel provided with improved means of absorbing mechanical shocks and vibrations according to this invention. Fig. 3 is a sectional view to a larger scale of part of the apparatus.

$a$ indicates the driving wheel, $b$ a plate which forms one side thereof and $c$ a marginal flange which with the plate $b$ forms a dish in which the shock absorbing device is placed. The outer periphery of the flange $c$ is formed with teeth $d$ and the inner periphery $e$ thereof is furnished with two lugs $f$ the opposite faces $g$ of which are parallel to one another and located a sufficient distance apart to receive between them a head hereinafter referred to.

The boss $h$ of the wheel is mounted to freely rotate upon a sleeve $i$ that projects inwardly from a driving lever $k$ having three arms $n$, 7 and 8. This lever is rigidly secured on the driving shaft $l$ by a key $m$ and the arm $n$ thereof, which extends from the sleeve $i$, terminates in an eye $o$ having a bearing $p$ in which is rigidly secured a stud $r$ by means of a nut $s$, the outer end $t$ of such stud projecting inwardly from the arm $n$.

$u$ is a pendulum lever which is mounted to freely oscillate on the end $t$ of the stud $r$ and the upper end of which consists of a head $v$ each side $w$ of which is suitably rounded, said head freely fitting between the parallel faces $g$ of the lugs $f$ of the driving wheel.

The part $x$ of the pendulum lever $u$ below the pivot stud $t$ is formed with a flanged oblong opening $y$ of the shape shown and of sufficient width to surround the boss $h$ of the driving wheel $a$ in such manner that the lever $u$ can freely oscillate to and fro about its pivot $t$ without coming in contact with such boss $h$. The lower end 1 of the lever $u$ terminates in a driving finger 2 whose surfaces 3 and 4 are inclined toward the stud $r$. Sometimes such surfaces, instead of being plain surfaces 4, as shown at the right hand side of Figs. 2 and 3, are each formed with a spherical recess 5, as shown at the left hand side of Figs. 2 and 3, for the reception of a spherical washer 6. The other two arms 7 and 8 of the driving lever $k$ are each furnished with a suitable boss 9, Fig. 3, provided with a bearing 10 that extends at a suitable angle to the center line A B. The two bearings 10 may be plain although they are preferably formed with screw threads 11 in which are mounted tubular sockets 12 and 13 the outer peripheries of which are screw threaded at 14 for a certain distance in order to screw into the bearings 10 and to be capable of adjustment endwise therein and be then secured in the desired position by locknuts 15 threaded on the screw threads 14 of the sockets and bearing against the ends 16 of the bosses 9.

The bore 17 of each tubular socket 12 and 13 is reduced in diameter at its outer end 18 thereby forming a shoulder 19 and a smaller hole or boring 20 which is screw threaded at 21 and in which is screwed a hollow adjusting screw 22 that is formed with a head 23 to facilitate its operation and the end 24 of which abuts against a washer 25 having a central hole 26 and which is located within the corresponding socket 12 or 13.

Extending centrally through each socket 12 and 13 is a buffer bolt 27 the end face 28 of the head 29 of which is spherical and the shank or spindle 30 of which passes through the washer 25 and through an axial hole 31 in the hollow adjusting screw 22, the projecting outer end of the bolt being threaded at 11

32 and having mounted upon it an adjusting nut 33. A helical spring 34 is threaded on the shank or spindle 30 of each buffer bolt 27, one end 35 of the spring bearing against the inner face 36 of the head 29 while the other end 37 abuts against the face 38 of the washer 25. The heads 29 of the buffer bolts are thereby caused to press against the faces 3 and 4 of the driving finger 2 and tend to maintain the pendulum lever $u$ in its normal position. The springs 34 are capable of being compressed or allowed to expand in their sockets by turning the adjusting nut 33 in the proper direction, on the screw end 32 of the buffer spindle.

The buffer bolts 27 with their springs 34 are capable of endwise bodily movement in the sockets 12 and 13 upon manipulation of the hollow adjusting screws 22; the sockets can also be readily adjusted endwise in their bearings so as to always insure the heads of the buffer bolts being in the requisite position in relation to the driving finger 2 of the pendulum lever $u$ so as to absorb and prevent any shock being transmitted to the driving wheel.

When the driving wheel $a$ is commencing to rotate say clockwise for example, it moves the head $v$ of the pendulum lever $u$ in the same direction, the other end or driving finger 2 of the pendulum lever is thereby gradually moved toward one side and pushes the corresponding buffer bolt 27 and spring 34 into the socket 12 until the face 3 of the driving finger, either directly or through the washer 6 before mentioned, comes in contact with the end of the socket 12 and thereby transmits movement to the driving shaft without shock, and, when the wheel is stopping, the buffer arrangement moves the pendulum lever to its normal position again also without shock. The driving lever $k$, when used for driving in one direction only, may be provided with only one spring buffer and socket arrangement as will be understood. The sockets 12 and 13 may each be furnished at its inner end with a square, hexagon or the like enlargement 39, as shown on the socket 12 in Fig. 2, to enable it to be readily turned for adjustment in its screwed bearing; or the inner ends thereof may be plain, as shown on the socket 13 in Fig. 2, and their outer ends 40 be suitably formed to facilitate the operation of turning them for adjustment in their bearings.

Instead of the gear driving wheel illustrated, a driving pulley or the like may in like manner be constructed with the improved shock absorbing devices described.

Instead of the wheel rotating on the sleeve of the driving lever it may in some cases be mounted to rotate on the shaft.

What we claim is:—

1. A wheel having lugs thereon, a stud, a pendulum lever mounted on said stud and with which the lugs of said wheel are adapted to engage, a driving lever adapted to rotate the wheel through said pendulum lever, and shock and vibration absorbing means between said driving lever and said pendulum lever.

2. A wheel having lugs thereon, a stud, a pendulum lever provided with a driving finger, mounted on said stud and with which the lugs of said wheel are adapted to engage, a driving lever adapted to rotate said wheel through the driving finger of said pendulum lever, shock and vibration absorbing means between the driving finger of said pendulum lever and said driving lever.

3. A wheel having lugs thereon, a rotary driving lever, a stud fixed to said driving lever, a pendulum lever mounted on said stud and with which the lugs of said wheel are adapted to engage, said driving lever being adapted to rotate the wheel through said pendulum lever, and shock and vibration absorbing means between said driving lever and said pendulum lever.

4. A wheel having lugs thereon, a rotary driving lever, a stud fixed to said driving lever, a pendulum lever mounted on said stud and with which the lugs of said wheel are adapted to engage, said driving lever being adapted to rotate the wheel through said pendulum lever, and a spring pressed buffer rod carried by said driving lever and bearing against said pendulum lever.

5. A wheel having lugs thereon, a three armed rotary driving lever, a stud fixed to one arm of said driving lever, a pendulum lever mounted on said stud and with which the lugs of said wheel are adapted to engage, said driving lever being adapted to rotate the wheel through said pendulum lever, and spring pressed buffer rods carried by the other arms of said driving lever and bearing against opposite sides of said pendulum lever.

6. A wheel having lugs thereon, a rotary driving lever, a stud fixed to said driving lever, a pendulum lever mounted on said stud and with which the lugs of said wheel are adapted to engage, said driving lever being adapted to rotate the wheel through said pendulum lever, a buffer rod carried by said driving lever, a spring pressing said buffer rod against said pendulum lever, and means for adjusting the pressure of said spring.

7. A wheel having lugs thereon, a rotary driving lever therefor, an oscillating lever mounted on said driving lever and one end of which is engaged by the lugs of said wheel, a projection on said driving lever being adapted to bear on the other end of said oscillating lever, and a spring pressed buffer between the projection of said driving lever and said oscillating lever.

8. A wheel having lugs thereon, a rotary driving lever therefor, an oscillating lever mounted on said driving lever and one end of which is engaged by the lugs of said wheel, a tubular sleeve adjustably mounted on said driving lever adapted to bear against the other end of said oscillating lever, a buffer rod carried by said sleeve, a spring carried by said sleeve and pressing said buffer rod against said oscillating lever, and means for regulating the pressure of said spring.

9. A wheel having lugs thereon, a stud, a rotary driving lever for said wheel having three arms, one of which carries said stud and the other two of which are each provided with a boss, an oscillating lever mounted on said stud one end of which lever is engaged by the lugs of said wheel and the other end of which is formed as a driving finger located between the bosses of the two arms of said driving lever, a sleeve screwed into each of the bosses of the two arms of said driving lever, a tubular nut screwed into one end of each of said sleeves, a buffer rod extending through each of said sleeves and said tubular nut thereof, a spring within each of said sleeves adapted to press the head of said buffer rod against the driving finger of said oscillating lever, a washer in each of said sleeves between one end of said spring and the inner end of the corresponding said tubular nut, and a nut screwed on the outer end of each of said buffer rods.

Signed at Leeds, England, this twenty-fifth day of August, 1908.

RICHARD WILKINSON BATEMAN.
LOFTUS HANSON BATEMAN.

Witnesses:
 ROBERT EDWIN PEACOCK CRAVEN,
 EDWIN CRAVEN.